United States Patent [19]
Dormer et al.

[11] Patent Number: 5,353,282
[45] Date of Patent: Oct. 4, 1994

[54] LOCAL AREA NETWORK EMBEDDED IN THE COMMUNICATION SWITCH CORE

[75] Inventors: Eric J. Dormer, Ottawa; Ernst A. Munter, Kanata, both of Canada

[73] Assignee: Northern Telecom Limited, Montreal, Canada

[21] Appl. No.: 33,227

[22] Filed: Mar. 18, 1993

[51] Int. Cl.$^5$ .......................... H04J 3/24; H04L 12/44
[52] U.S. Cl. .......................... 370/58.1; 370/58.3; 370/60; 370/85.2; 370/85.6; 370/94.1; 370/94.3; 340/825.5
[58] Field of Search .......... 370/53, 55, 56, 58.1, 370/58.2, 58.3, 60, 60.1, 61, 85.1, 85.2, 85.3, 85.6, 85.13, 85.14, 94.1, 94.3; 340/825.01, 825.02, 825.14, 825.5, 825.51, 825.06; 379/258, 268, 269

[56] References Cited

U.S. PATENT DOCUMENTS

| | | | |
|---|---|---|---|
| 4,809,362 | 2/1989 | Claus et al. | 370/94.3 |
| 4,894,824 | 1/1990 | Hemmady et al. | 370/58.3 |
| 4,998,247 | 3/1991 | Irvine-Halliday et al. | 370/94.1 |
| 5,109,379 | 4/1992 | Kume et al. | 370/94.3 |
| 5,189,414 | 2/1993 | Tawara | 370/94.3 |
| 5,237,566 | 8/1993 | Brand et al. | 370/94.3 |

Primary Examiner—Alpus H. Hsu
Attorney, Agent, or Firm—Yoshiharu Toyooka

[57] ABSTRACT

Local area networks which take advantage of the star configuration of the switched telecommunication networks are disclosed. The local area networks of the present invention use a small part of the central memory of the switch core and employ either centralized or distributed logical bus collision control mechanisms to provide inherent broadcast capability.

14 Claims, 5 Drawing Sheets

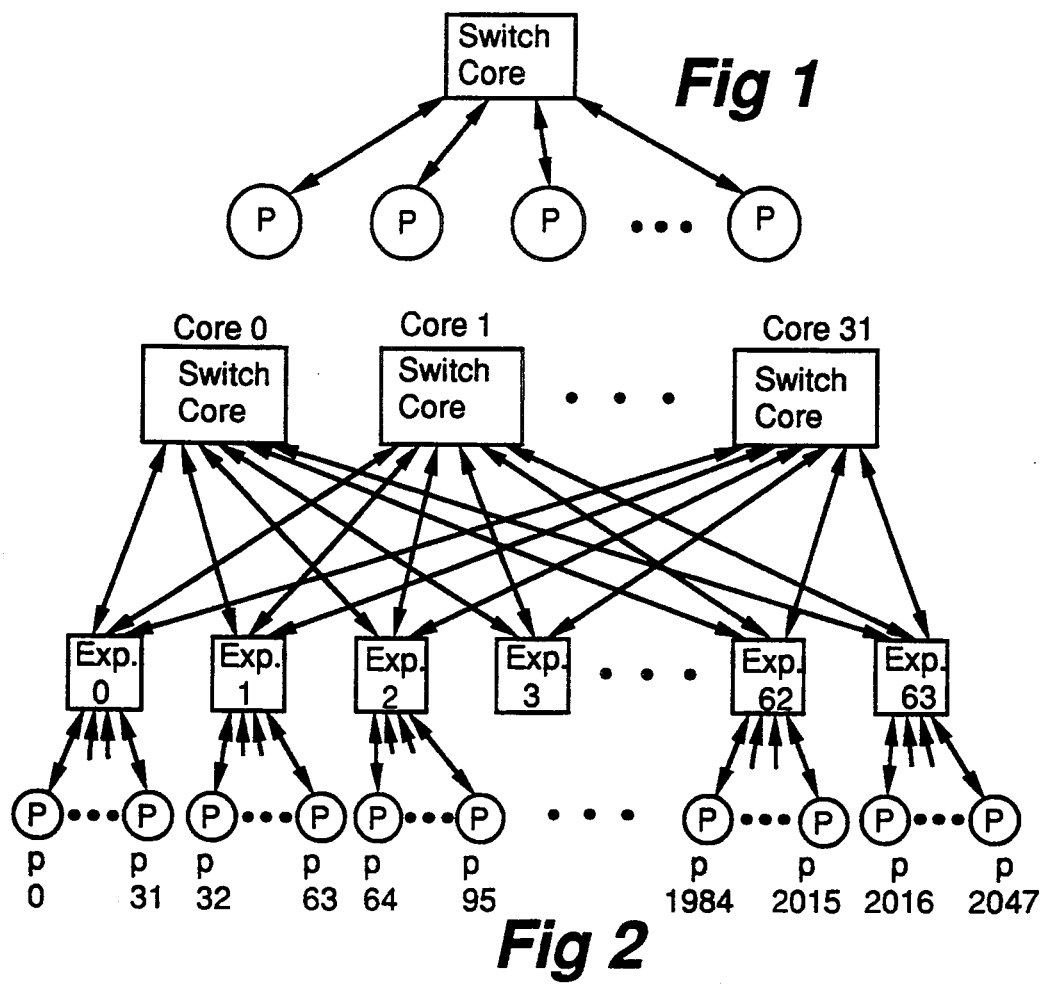
Fig 1
Fig 2
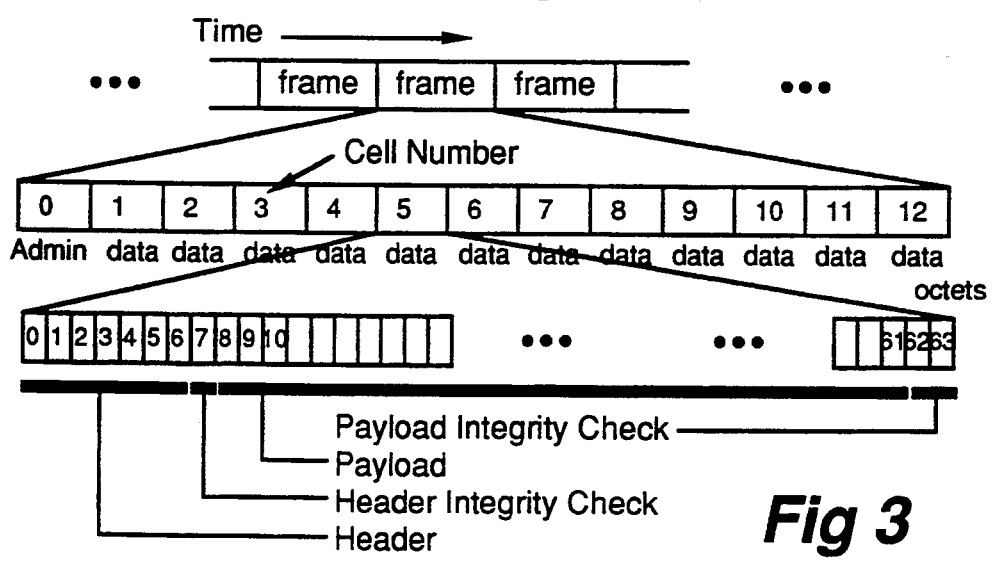
Fig 3

LOCAL AREA NETWORK EMBEDDED IN THE COMMUNICATION SWITCH CORE

Field of the Invention

The present invention is directed to a local area network and, in particular, to such a local area network which is embedded in a broadband telecommunication switching system and uses a small amount of memory in the switch core of a common memory switch.

Background of the Invention

There is no denying that local area networks (LANs) are now recognized as a valuable tool toward the "office or factory of the future", from the points of view of organization-wide resource sharing, computer interconnection, etc. By using a dedicated line or a leased public network, many LANs are also connected to form a network called MANs (metropolitan area networks), or WANs (wide area networks), depending upon their geographic span. Generally speaking, a LAN requires a dedicated transmission medium and elaborate protocols for medium access control, collision avoidance, etc. At the same tinge, it is also apparent that telecommunication switching systems are becoming faster in speed and larger in capacity (bandwidth). To facilitate this growth, high bandwidth switching systems are becoming more distributed, with a need to distribute control and management information. ALAN is a good vehicle for this purpose. It should therefore be possible, and in some cases it may be desirable, that a LAN be established using the resources available in high speed switching systems.

Objects of the Invention

It is therefore an object of the present invention to provide a local area network which utilizes the central core of a common memory switch.

It is another object of the present invention to provide a local area network using a simple competition protocol which requires only a small number of memory locations in the central common memory switch.

It is yet another object of the present invention to provide a local area network which is fast and requires less dedicated hardware.

Summary of the Invention

Briefly stated, the present invention relates to a local area network (LAN) embedded in a switched communication network containing a common switch core and nodes among which data are being switched in framed cells by way of the core memory of the common switch core. Each frame is composed of an administration cell and zero or more data cells. The local area network of the present invention is for switching LAN data cells among the nodes by using the administration cell. It comprises the switch core having at least first and second LAN data memory locations in the core memory. The first and second locations alternately function as a collection location for collecting a LAN data cell to be broadcast, and as a broadcast location for holding a LAN data cell that is being broadcast in each successive frame time. The nodes are connected to the common switch core and arranged in a physical star fashion relative thereto in a predetermined logical order among the nodes so that, in each successive frame time in the logical order, each node reads a LAN data cell from the broadcast location and writes its own LAN data cell in the collection location.

According to another aspect, the present invention is also directed to a method of switching a LAN data cell through a local area network embedded in a switched communication network. The switched communication network contains a common switch core and nodes which are connected to the common switch core in star fashion. Data is switched among the nodes in framed cells by way of the core memory of the common switch core. Each frame is composed of an administration cell and zero or more data cells. In the local area network, the nodes are arranged in a predetermined logical order among themselves and the LAN data cell is contained in the administration cell. The method of switching the LAN data cell in the local area network comprises a step of each node reading a LAN data cell stored in the first LAN data memory location of the core memory and sending to the common switch core either a competing LAN data cell to be collected in the second LAN data memory location thereof, or an indication of no competition during each successive frame time of transmission of a frame, in the logical order. The method further includes steps of reversing the role of the first and second LAN data memory locations in each successive frame time and repeating the frame times until no node has a competing LAN data cell to send to the common switch core.

Brief Description of the Drawings

For a more complete understanding of the present invention and for further objects and advantages thereof, reference may now be made to the following description, taken in conjunction with the accompanying drawings, in which:

FIG. 1 is a general topology of an unexpanded switched communication network;

FIG. 2 is a general topology of an expanded switched communication network;

FIG. 3 is an illustration showing the framed cell format;

DETAILED DESCRIPTION OF PREFERRED EMBODIMENTS OF THE INVENTION

Figure 4:
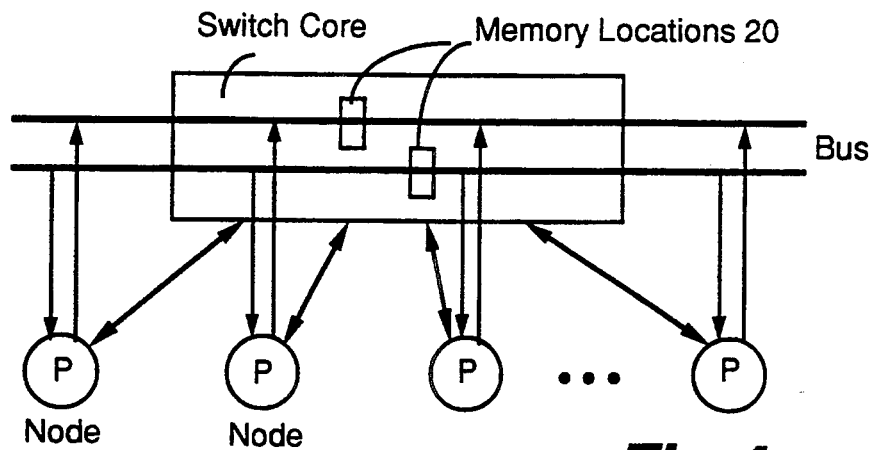
FIG. 4 is a logical bus LAN topology of the unexpanded system.

Large bandwidth high speed switches tend to require multiple bays of equipment, holding peripherals, switch cores, and processors. One requirement in this environment is good communication between the peripherals, switches, and processors. One method of providing this control network is to use a small portion of the link bandwidth between peripherals and the switch core to carry control information. A method of switching or sharing this bandwidth between all nodes in a fair and efficient manner is required. It is possible to establish a LAN-like protocol using a small amount of core memory, and simple protocol rules which can be implemented in peripheral hardware and in switch core hardware.

FIG. 1 shows the general topology of a typical broadband switching system, illustrating a physical star configuration with each peripheral node, i.e. the node to which peripherals connect having one link to the central switch core.

FIG. 2 illustrates the more complicated topology of an expanded broadband switching system in which multiple expansion units (Exp 0, ... Exp 63) and multiple switch core units (Core 0, ... Core 31) could be combined to make a very large switch. In a physical star configuration with multiple peripheral nodes and a switch core at the hub as shown in FIG. 1, each peripheral sends into the switch core a continuous stream of cells of data, with the cells grouped into frames. As an example, FIG. 3 shows one frame which consists of 13 cell slots, while each cell contains 64 octets. The first cell slot holds the administration cell and the remaining cell slots are used to carry other types of traffic, as provided by the customers, which might be STM or ATM. In the time a frame is being submitted (called the frame time), all other peripherals are also submitting their frames to the switch core, and thus in a frame time each peripheral node submits a single administration cell to the switch core, and has the opportunity to read a single administration cell. The bandwidth across the system corresponding to the administration cell slots can be considered an administration channel. In a typical embodiment with 13 cells in each frame, where 12 cells are used to carry an OC12 amount of customer data (622 Mb/s), the administration channel corresponds to approximately 50 Mb/s. The administration channel is designed to carry various operation, administration, and maintenance (OAM) information from an intelligent control processor to each of the peripherals, expansion units, and switch cores in a broadband switching system. Some of this information is relatively low speed (i.e. maintenance commands etc.), while other information demands rigorous real-time speeds (i.e. connection information in a real-time switch). The present invention makes use of the administration channel formed by the administration cell slots found in each frame to create a LAN environment that allows communication on demand between any of these entities.

The LAN in an expanded system such as one shown in FIG. 2 can be viewed as a hierarchy of LANs, with a LAN operating on each expansion unit serving the subtending peripherals at its peripheral nodes, and a higher level LAN operating on Core 0 serving all the expansion units. For LAN purposes, switch core units 1 to 31 would each be considered a subordinate to a designated expansion unit.

FIG. 4 shows a logical bus LAN topology which can be implemented within the physical star configuration of the switching system described above. Memory locations 20 which all nodes can read, and all nodes can write, are analogous to shared bus media. One characteristic of bus approach is the possibility of bus collision, where multiple senders want to drive the shared media simultaneously. The present invention resolves bus collision by using a simple competition protocol that ensures that the available bandwidth is allocated in a fair manner to enable maximum bandwidth utilization, without the possibility of corrupted broadcasts.

Figure 5:
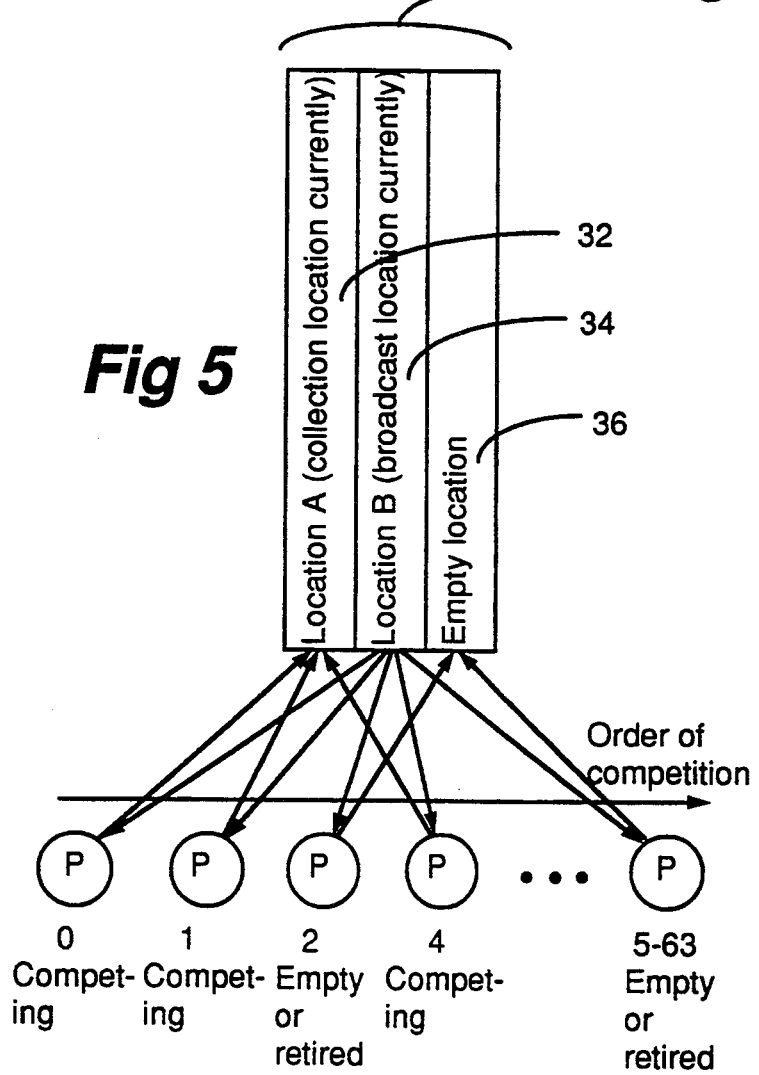
FIG. 5 is a schematic illustration of the competition protocol.

FIG. 5 illustrates the competition protocol according to one embodiment of the present invention. The 64 peripheral nodes designated by P are logically enumerated from 0 to 63, corresponding to the temporal sequence of the arrival of their administration cell slots in a frame time. This competition sequence can be arbitrary but is fixed upon system initialization. In the administration cell slot, each peripheral node sends either a competing LAN data cell (containing a message), or a non-competing cell (indicating no message is to be broadcast) to the switch core 30. The switch core contains two memory locations 32 and 34, called locations A and B. Locations A and B are used alternately for collecting the competing data cells sent from the peripheral nodes, and then broadcasting the winning competitor cell collected in the previous frame to all the peripheral nodes. Locations A and B reverse their roles in every subsequent frame time, that is, location A is the collection location and location B is the broadcast location in one frame, location A becomes the broadcast location, and location B the collection location in the next frame. A location where empty or non-competing cells can be discarded is shown at 36 but no location is required if these cells are simply not written into memory.

To begin with, it is assumed that location A is collecting the next cell to be broadcast and location B is holding the cell currently being broadcast. When a new round of competition begins, each peripheral node which wants to send a message writes its competing LAN data cell into the collection location by overwriting the incumbent cell with its own cell. Any peripheral node which does not want to transmit a message must send a non-competing cell to the switch core which will not be stored in the collection location. The last competitor in the competition sequence of all 64 peripheral nodes wins the battle to be selected, and at the end of the competition sequence (after all peripheral nodes have been considered) its cell remains in the collection location. It becomes the winning peripheral node. At this time, locations A and B reverse roles. What was the collection location becomes the broadcast location, and vice versa. While this competition is occurring in the inbound direction, each peripheral node reads the winning cell of the previous frame time from the broadcast location in the outbound direction. If the LAN data cell is addressed to a particular peripheral node, then that node may process it upon reading it, otherwise it will be ignored after being read. In each subsequent frame the previous winning LAN data cell is broadcast. The peripheral node which observes its own competing cell being broadcast retires from further competition until the next round. After retiring it submits only non-competing cells to the switch core. The remaining peripheral nodes continue to compete in successive frames. This time each one has a better chance of winning because there is one less competitor. In each frame, the last competitor in the logical sequence will win, its cell will be broadcast, and it too will retire. The process continues until all the peripheral nodes are issuing non-competing cells and this condition indicates that it is time to start a new round.

In a time-multiplexed central memory design, access to the common memory is multiplexed among all peripheral nodes such that each node has exclusive access for a short time. Thus, although multiple nodes may attempt to broadcast in the same frame, only the final competitor in the logical sequence wins, and there is no corruption of data. If a competitor enters a round late, it is not disadvantaged in any way. Once it wins (which will be immediate if all other competing peripheral nodes have submitted their cells earlier in the competition sequence), it retires also.

Managing and controlling access to the two locations A and B can be done centrally, or in a distributed way. For reliability purposes, the central control is preferred. In the centralized control embodiment, the peripherals are unaware of the actual storage locations used for A and B, and a circuit located in the central switch core is responsible for knowing what two locations are being used for A and B, and for alternating them after each frame time. In the distributed control embodiment, the centralized circuit is not required and the switch core hardware can be completely generic, however, the peripheral nodes themselves must know what locations are used for locations A and B, alternate them each frame time, and ensure frame synchronization with all other competing peripheral nodes.

In general, the LAN described here can transfer cells between any entities with access to the administration cell slots. Discussion to this point has focused on peripheral nodes but, generally, other equipment can also be included. For the remainder of this disclosure, all possible participants in the LAN shall simply be called nodes. These nodes can include peripherals, the switch control processor, switch cores, expansion units, and intelligent controllers, although the switch core, expansion units, etc., require taps, which will be described later.

Figure 6:
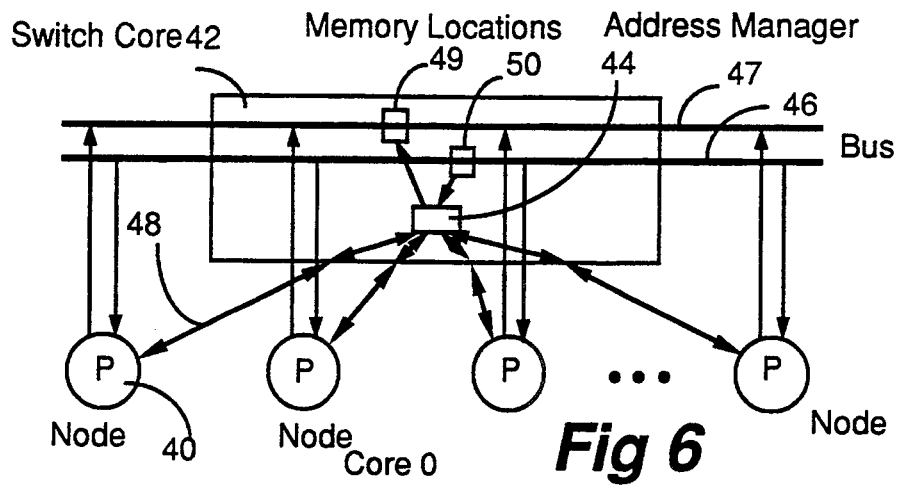
FIG. 6 is a diagram showing the centralized control logical LAN.

FIG. 6 illustrates the centralized control logical bus LAN in a non-expanded system according to one of the preferred embodiments of the present invention. In this centralized scheme, the entity in the switch core which actually controls the central switch memory places incoming competing and non-competing administration cells in the appropriate locations. Similarly, this entity reads from the appropriate locations when a broadcast is required. However, because the central entity (which may be intelligence, logic, software etc., subsequently referred to as the address manager) determines the actual addresses for the locations, the nodes need not be synchronized. The added address generation capability required from the address manager, however, amounts to a new specialized switching mode in the switching core. The address manager also provides a single point of control to aid in debugging, controlling malfunctioning nodes, and initializing the network.

In the Figure, the nodes are designated by 40 and switch core by 42. An address manager 44 of the switch core coordinates the activity to facilitate the sharing of the memory locations 49 and 50. Communication paths between the nodes and the switch core are diagrammatically shown by buses 46 and 47, but actual transmission of information takes place through the star network in which nodes and the switch core are physically interconnected with bidirectional communication links 48. An address manager 44 controls access to the switch memory by generating the addresses required to place competing cells into the collection location 49. Similarly it generates the addresses to read the broadcast location 50. When multiple nodes read the same location in the same frame this is analogous to all listening to a common broadcast bus 46.

Referring back to FIG. 5, assume that location A is collecting the next cell to be broadcast, and location B is holding the cell currently being broadcast. A round is defined as a sequence of frames where all interested nodes are able to broadcast. A round ends when no node is interested in broadcasting or those that are interested have already exhausted their allocation for the current round. In the centralized control embodiment, the address manager senses when no node is submitting a competing cell. This causes the address manager to broadcast a special start-of-round cell indicating to all nodes that a new round can begin. All peripheral nodes which were retired but want to send are then free to begin sending their competing LAN data cells to the core once again.

The competition protocol exercised by the nodes themselves is simple: a node competes when it wants to, and continues to compete with the same cell until it sees the cell get broadcast, then retires. It comes out of retirement when it sees the start-of-round cell get broadcast, and then competes again whenever it is ready. The aggregate result of each node running this algorithm can be monitored by the address manager which ensures that the network is performing properly.

The basic competition protocol exercised by the address manager is equally simple: all incoming competing LAN data cells are processed in sequence of their arrival, and placed in the collection location overwriting any cell stored there. At the end of the frame time the addresses used for the collection location and the broadcast location are exchanged. In the event that no cell competes in a frame, each outgoing administration cell slot in the next frame is filled with the contents of the start-of-round location. If there was some competition in a frame, then each outgoing administration cell slot is filled with the contents of the broadcast location. The start-of-round cell must be previously data-filled in the core memory at the time of initialization of the LAN.

Figure 7:
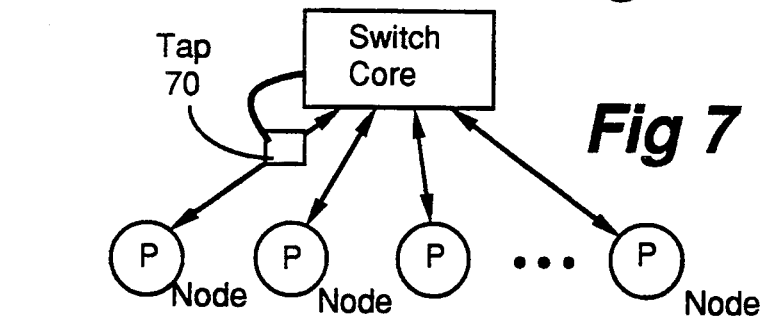
FIG. 7 shows the tap on the non-expanded system.

Each switch core is the hub for a number of peripherals nodes. These peripheral nodes terminate the LAN protocol and have the opportunity to submit cells and monitor broadcasts. However, the hub itself has no direct access to the LAN because it is not in a position to submit cells or monitor broadcasts in the traffic stream running though it. To provide a hub with a communication capability on the LAN, a tap 70 must be provided that can be put in series with the traffic on a port running to a peripheral node as shown in FIG. 7. A basic switch core would need at least 2 taps: one for the core itself, and one for the intelligent controller which is designed to reach all hardware via the LAN. All peripheral nodes and tap nodes monitor the broadcast LAN data simultaneously. On any specific port, either node can attempt to send out messages, but the tap node wins the competition over the peripheral node by overwriting the LAN cell as it passes through with its own. Since the peripheral node simply recognizes that it did not win the competition, it will try again later in the following frame.

Figure 8:
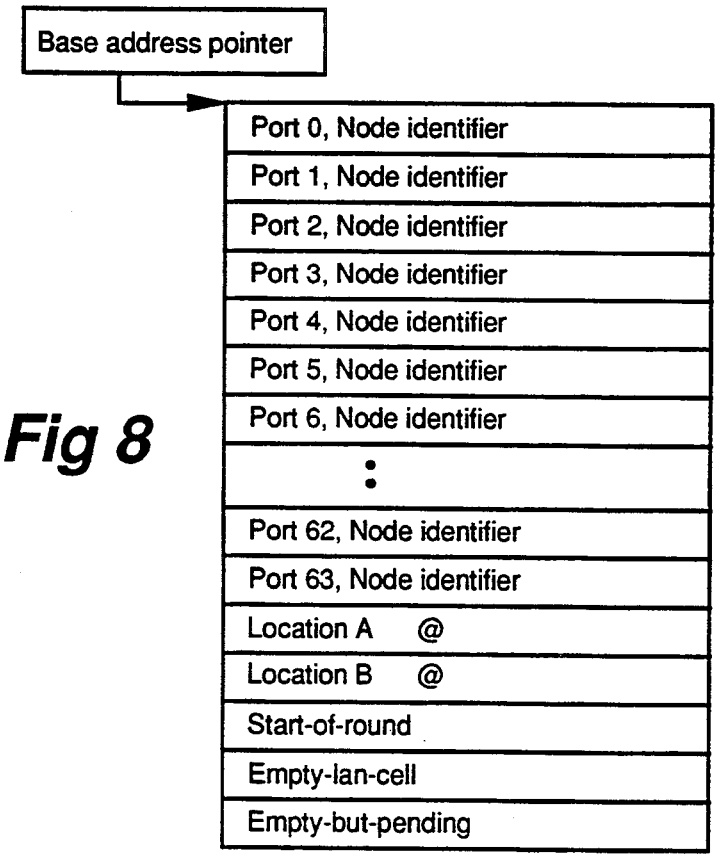
FIG. 8 is a table of cells in the central memory for the centralized control LAN.

No synchronization is required between nodes. Nodes require no information regarding the addresses used by the address manager to support the LAN. They simply send in cells, and monitor the broadcast during the administration channel. To manage the LAN, the address manager uses a small portion of the central memory for LAN purposes. FIG. 8 shows a memory map of this block of memory. The actual location is programmable and is written into a base address register in the address manager. The locations marked by @ are changed dynamically but all other locations are datafilled upon initialization and do not change afterward.

As a further refinement of the above protocols, various criteria can be considered and adopted for improved performance in further embodiments of the invention:

Allocation (to achieve a non-uniform distribution of bandwidth between nodes):

A round is used as a mechanism for fairly allocating bandwidth to all the nodes on the LAN. In the description thus far, all nodes have an allocation of 1. However, in another embodiment, each node is given an allocation independent of the other nodes, that is to say, each node is permitted a number of broadcasts in a round. In any round, no node broadcasts more often than its allocation permits. Once the node has used its entire allocation, it must retire from further competition until other nodes have also had a chance to broadcast. Eventually the node will have no more messages to send or it will have used all of its allocated opportunities to broadcast. In either case, it will issue an empty-LAN-cell to signal that it is no longer competing. This gives other nodes a chance to broadcast. The allocation can be varied dynamically. This is useful for a node which services a very active LAN user. Because all nodes monitor the start of each new round, nodes with large allocations can time the duration of the round and reduce the allocation if the overall round time is above a certain threshold.

Priority (to allow certain nodes to access their share of bandwidth earlier in a round than other nodes):

Theoretically, any number of priority levels can be allowed, but in a preferred embodiment only four levels will be supported. Urgent alarm messages will be highest in priority; all other traffic will be lower. The address manager must consider the priority of a competing cell to determine if it is equal to or higher than the priority of the most recent winning competitor. If it is, then it overwrites the incumbent winning cell.

Sit-Out Times (to avoid redundant retransmission of a winning cell):

After a competing cell wins a competition the address manager normally ensures that the node from which it came is prevented from competing again for a short time. The exact time each winning node is forced to sit out is programmable and must be equal to or greater than the latency between the time a winning node submits a cell, and the time it observes the cell being broadcast. In a system with substantial propagation delays, or multiple levels of competition hierarchy such as an expanded system which will be described later, this latency could approach several frame times. The sit-out mechanism prevents a node from repeatedly competing with the same winning cell and causing a repeat broadcast of the same cell. Forcing the peripheral to sit out allows time for the broadcast cell to reach the originating node and for that node to withdraw the already broadcast message. The node may subsequently choose to create a new competing message or may retire from further competition in the round.

Prevention of bus hogging (ensuring fairness):

The address manager prevents bus hogging by any single node. This is accomplished naturally by the sit-out mechanism described above. This mechanism ensures that even if a renegade node with the highest priority tries to broadcast continuously, it will not have exclusive control of the LAN. Other nodes will get access during its sit-out times and can communicate normally, but with reduced bandwidth. Since each node monitors all broadcasts, all could potentially discern whether or not any node was taking more than its fair share, and could send a protest message directly to the offending node. In addition, the address manager can instruct the renegade node to shut down, or re-initialize using special single cell instructions. If this fails, the address manager can specifically exclude the renegade node from further competition.

Block Transfer:

A block-transfer-request cell is an exception to the rule of forcing a node to sit out after winning the competition. This cell gives special control abilities to sophisticated nodes which have large allocations (such as the tap node used by the intelligent controller). Once a block-transfer-request cell is broadcast competition is immediately halted, giving the originating node exclusive use of the LAN until it chooses to allow competition to resume. While competition is halted, the node can issue a large number of sequential cells made up of a very large block of data which will all be broadcast. When the node is prepared to resume normal operation, it issues a special cell called end-block-transfer and the competition resumes where it left off. The block-transfer-request cell includes a field which defines the upper limit of the time the node can claim exclusive control of the LAN. If it tries to hold the LAN longer the competition automatically resumes, and the error is recorded by the address manager. If an end-block-transfer cell arrives and competition was not already halted, then that cell does not compete for broadcast but instead is discarded. The block-transfer-request must first win the competition to assert itself. In doing so, it can win with any particular priority level. During the subsequent interval while competition is halted, another node with an urgent message can restart competition by submitting a competing cell with a priority higher than the original block-transfer-request cell. If this "interruption" occurs, the halted state is aborted and an abort-block-transfer cell is broadcast. The node which was interrupted will note that its block-transfer-request was overridden by another node, and may retransmit the entire block from the start later.

Figure 9:
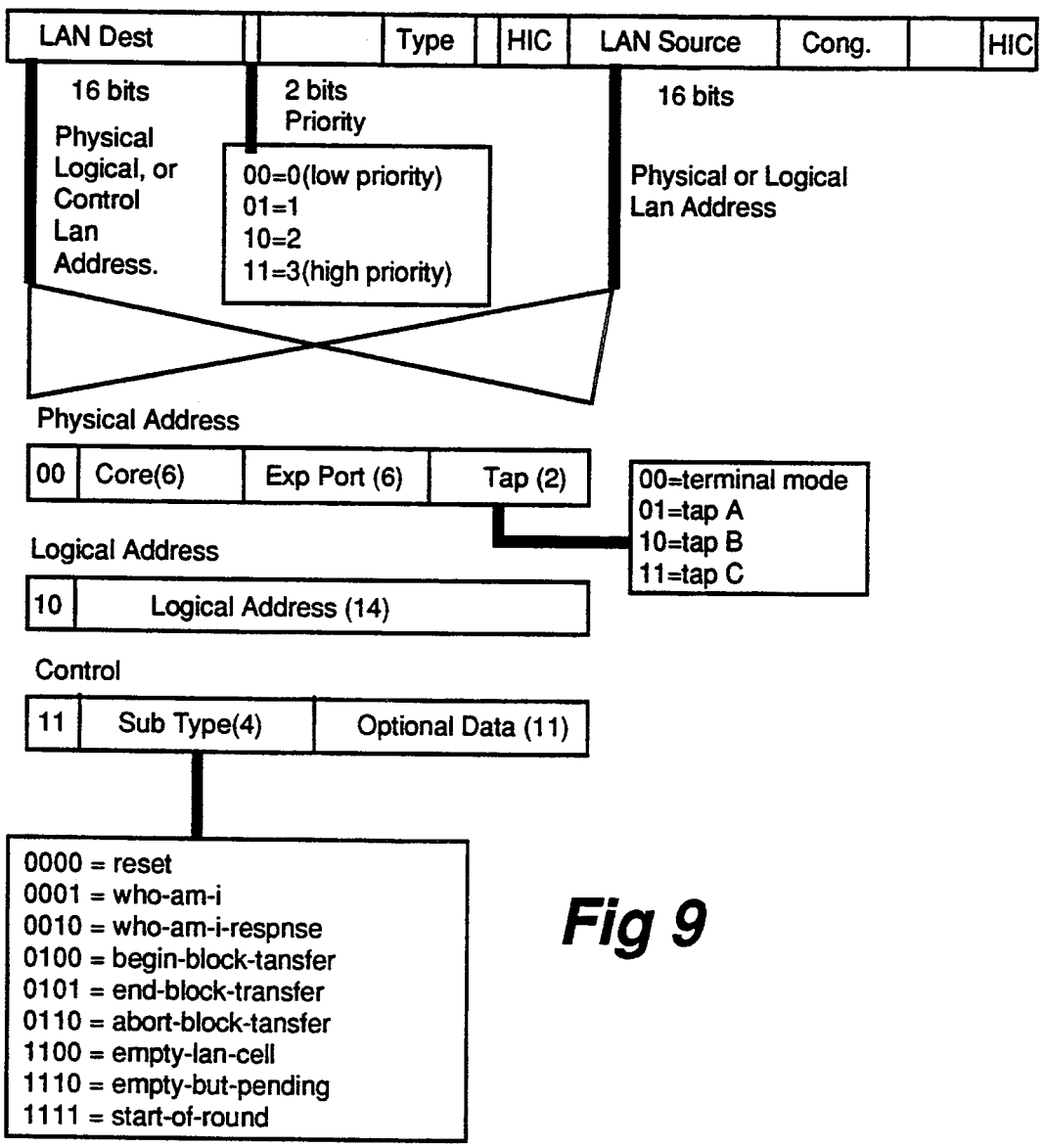
FIG. 9 shows types of cells, and their construction, used in this embodiment.

The following LAN cell types are supported, and FIG. 9 shows the cell structure for each type:

reset: issued by address manager to force all nodes on a port to reset.

who-am-i: issued by a node (in response to a reset) to ask what port it is connected to.

who-am-i-response: the response from the core to the inquiring node. Each port on every expansion unit or switch core gets a unique response.

start-of-round: issued by the address manager to indicate a new round.

empty-LAN-cell: issued by node to decline competition.

empty-but-pending: issued by the address manager when all competing ports are also sitting-out.

competing-LAN-cell: issued by a node to compete for broadcast.

block-transfer-request: issued by a node to claim exclusive use of the LAN.

end-block-transfer: issued by a node to release exclusive use of the LAN.

abort-block-transfer: issued by the address manager to indicate that a block transfer is ending prematurely in response to a high priority interrupt.

In summing up, distribution of responsibilities is as follows; each node is responsible for several functions:

a) sending LAN cells to the core when it wants to send out a message;

b) monitoring the LAN cells arriving from the core to see all broadcasts; and c) performing a simple protocol to share the LAN with all other nodes.

The address manager is responsible for several functions related to the LAN:

a) providing unique identifiers to each node for initialization;

b) ensuring that no node hogs the LAN continuously;

c) giving special nodes uncontested access to the LAN for long uninterrupted transmissions;

d) providing multiple levels of priority;

e) ensuring that repeat broadcasts of cells do not occur;

f) managing the two locations used for collecting and broadcasting cells;

g) signalling the beginning of a new round; and h) collecting statistics on LAN performance.

Figure 10:
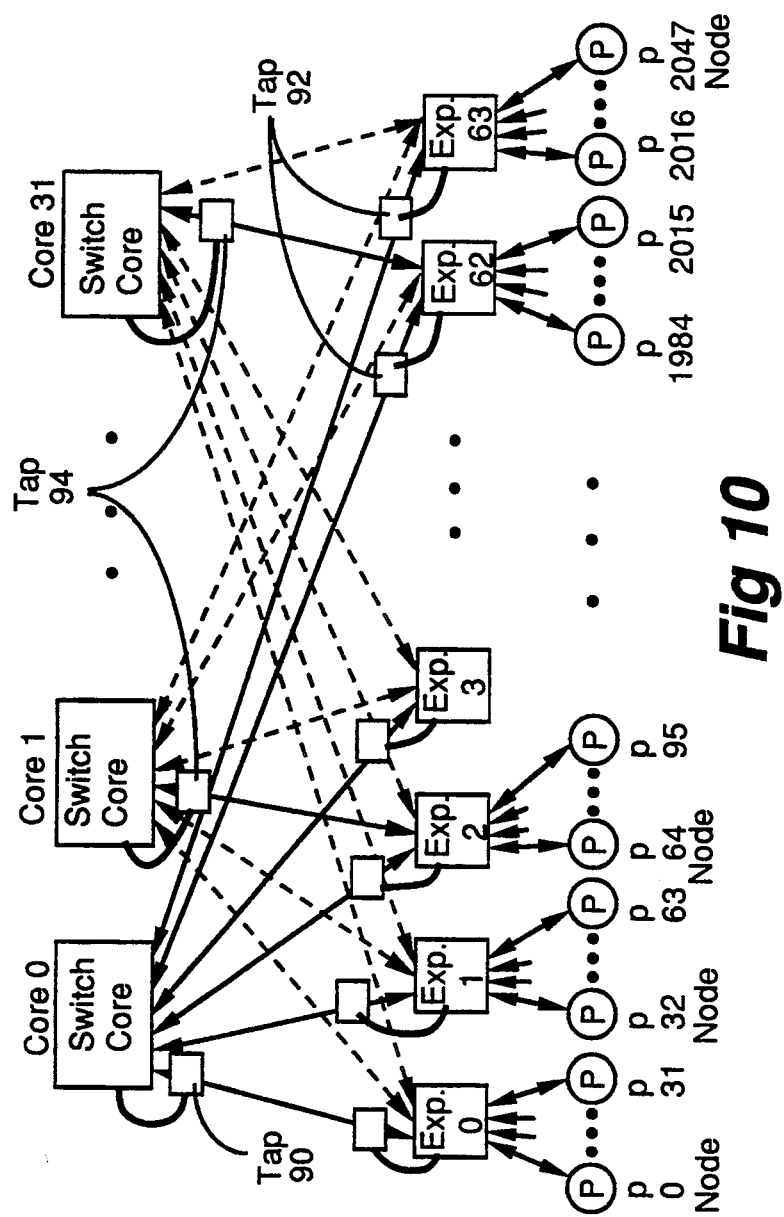
FIG. 10 is a diagram showing the centralized control logical LAN of the expanded system.

FIG. 10 illustrates the centralized control logical bus topology used in an expanded network. In the Figure, 32 switch cores support 64 expansion units. Each expansion unit consists of similar hardware to a switch core and in turn serves 32 peripheral nodes. Up to 2048 peripheral nodes can be supported. In terms of LAN operation, switch core 0 performs like the unexpanded hub described thus far, however, the participants on its LAN are actually the 64 expansion units. In turn, each expansion unit manages a lower level competition among all its subtending nodes. The expansion unit is responsible for selecting the winning competitor from all the subtending nodes, and then advancing this winner into the next level of competition on switch core 0 itself. The expansion unit observes the broadcast cells from switch core 0 and rebroadcasts them to all its subtending nodes. It also monitors the cell being broadcast to determine if it is its own. If this is the case, then it selects the next winning cell from the local competition and begins sending it to core 0. The Figure also shows tap 90 on core 0, and taps 92 on each expansion unit. For the purposes of LAN competition, taps 94 provided on switch cores 1 to 31 are considered to be subtending nodes from designated expansion units, where every second expansion unit supports exactly 1 switch core, and these nodes compete against other peripheral nodes to win local competitions at the level of the expansion unit.

The sit-out feature of a winning node is used in both the switch core and the expansion unit by their address managers. The switch core forces the winning node, which happens to be an expansion unit, to sit out after it is broadcast. It must sit out long enough for the cell to reach the expansion unit from the core. Then the expansion unit will force the local node which won the broadcast to sit out long enough for the broadcast to filter all the way down to the originating node itself. In the meantime, the competition can proceed on the expansion unit (but excluding the node that is sitting out), to select a new local winner.

It is important to note that the broadcast LAN traffic is available to the switch cores other than switch core 0 only through rebroadcast from an expansion unit. By convention, expansion unit 0 is assigned this job. It has the responsibility to rebroadcast to all the core links (except for switch core 0), and to enroll all these core links in the regular competition to broadcast messages. The other expansion units will block out core links from competition. Although they may choose to rebroadcast to these core links, such broadcasts would not be received since the taps 94 on the switch cores will be on port 0 in all cases which run to expansion unit 0. The taps on these switch cores will operate like peripheral nodes; they will issue a competing cell or empty-LAN-cell in all cases.

One new function is required from the address manager on the expansion unit. Cells arriving on port 0 (which is always connected to switch core 0 by convention) carry the broadcast information. The address manager in the expansion unit places this information in a reserved location for later rebroadcast. For all other ports, the rebroadcast cell is normally provided in the next administration channel. This effectively achieves the full broadcast, first from core 0 to the expansion units, and then from the expansion units to all peripherals, taps, and other switch cores.

Start-of-round cells are not issued until switch core 0 determines that all expansion units are submitting empty-LAN-cells. In situations where the only nodes competing on an expansion unit are also forced to sit out, then the expansion unit issues empty-but-pending cells to inform the core not to declare a new round until these nodes have a chance to retire or continue competing.

Most nodes only respond to broadcast LAN cells which have the sub-type of competing-LAN-cell or start-of-round cell. Other LAN cells are ignored. The exception to this is after a node issues a who-am-i cell, it waits for the who-am-i response. Also, any node which initiates a block transfer also waits for an abort-block-transfer cell.

Initialization of the LAN:

The address manager must support a facility for sending out one specific cell to all nodes on each physical port. This cell is a unique identifier to be recorded by every node on the port. Without this identifier, no node can determine which LAN broadcasts are destined is for it. To issue this cell, the address manager requires a "who-am-i response" feature. This is the ability to send out the appropriate identifier cell from the table stored in central memory to any port from which a "who-am-i" request arrives. The first 64 elements of FIG. 7 contain such a table. Once a "who-am-i" request is received by the address manager, it responds by sending out the appropriate identifier cell for that port by indexing the local port counter value into the table. The peripheral node and any tap node derive their LAN address from the "who-am-i response" identifier cell. The who-am-i and subsequent response does not impair the LAN performance for other active nodes in any way.

Initializing an expanded system is hierarchical. First switch core 0 data fills its table with appropriate identifiers for the 64 subtending expansion units. Upon power-up each expansion unit initially has no information on its configuration but, as shown in FIG. 10, is aware that its port 0 is connected to switch core 0 (by convention). Upon power-up, it simply ensures that only empty cells are emitted on port 0. Also by convention, the tap on the expansion unit will always be on port 0. The tap on port 0 will then issue the "who-am-i" request, which will elicit a satisfactory response from switch core 0, whereupon, the LAN itself can be used to transfer initialization commands and datafill from a control processor tap to the taps associated with each expansion unit. This will allow the identifiers to be datafilled into the expansion unit tables. Subsequently, the peripherals, and other switch cores will receive a satisfactory response to their who-am-i requests.

The LAN according to the present invention possesses the following features:

- It is self-initializing. Upon power-up, the switch core shelf controller creates a table of port identifiers in the switch core central memory. The appropriate identifier is then distributed to each peripheral upon request from that peripheral. Upon power-up, or when any peripheral or tap forgets its identifier, it issues a "who-am-i" request cell in every outgoing administration slot. The address manager sees this cell and responds by sending the peripheral the appropriate element from the table of identifier cells that are stored in central memory. In expanded systems a two stage process is required. First a minimal LAN is established to talk to each of the expansion units, then they are instructed to build their own tables of identifiers and configure their subtending nodes appropriately. Once this is achieved, the full LAN is in operation. Then the normal LAN protocol can commence.
- It is robust. All peripherals run a simple algorithm to support the LAN. Upon power-up, or after a glitch, any affected node is obliged to ask "who-am-i" and subsequently after learning its identity, it will be able to fully participate in the LAN protocol. The process of distributing port identifers to a peripheral does not disturb or abort any other LAN transactions, and does not impact the traffic in non-administration cell slots of the frame in any way.
- It provides an assured communication path.

Once a node sends a message, it repeats the message continuously until the same message gets broadcast. If something corrupts the message before arrival at the core, it will be discarded by the core. The original sender will continue to issue its message, effectively re-transmitting it. When it is finally broadcast correctly, the sender will be satisfied and stop trying to send the message. Once the message is sent out, the sender respects the protocol and retires until the next round begins. The beginning of the next round is indicated by a start-of-round cell being broadcast.

- It is simple.

All senders share a common communication medium. It uses a protocol which has the following characteristics:

(a) There is never a collision which causes corrupted data. The LAN always carries valid cells.
(b) No senders ever have to back-off. In any round each can just continue attempting to send until successful.
(c) There is a guaranteed maximum time for any peripheral to transmit its message.
(d) In all systems, there is efficient and fair division of available bandwidth among nodes.
(e) Little bandwidth is wasted under heavily loaded conditions.

- It assures a fair bandwidth allocation.

The allocation of bandwidth to each peripheral is inherently fair and becomes more efficient under increased traffic load with multiple senders. The protocol automatically divides the available bandwidth among all nodes waiting to broadcast, giving each node $a/(A+1+S)$ of the available bandwidth on the LAN in an expanded or non-expanded system, where S=sit out time, A=total allocation of all interested nodes, and a =allocation of a particular interested node.

- The LAN naturally supports broadcast capability.

Logically all nodes share a common bus and thus broadcast is implicit.

To achieve point-to-point communication when necessary, the cells contain the address of the intended receiver. All other receivers will ignore the cell. To achieve broadcast, a special address which identifies all receivers can be used.

- It is fully expandable.

It will support all ports which can be added to a broadband switch, even in a fully expanded system. This does not demand extra hardware in the non-expanded system.

What is claimed is:

1. In a switched communication network containing a common switch core and nodes among which data are switched in framed cells by way of a core memory of said common switch core, each frame being composed of an administration cell and zero or more data cells, a local area network for transmitting LAN data cells among said nodes by using said administration cell, comprising:

said common switch core having at least first and second LAN data memory locations in said core memory, said first and second LAN data memory locations alternately functioning as a collection location for storing a LAN data cell to be broadcast and as a broadcast location for holding a LAN data cell that is being broadcast in each successive frame time; and said nodes connected to said common switch core and arranged in a physical star fashion relative to said common switch core in a predetermined logical order, so that each node reads said LAN data cell held in said broadcast location and writes its own LAN data cell in said collection location in each successive frame time in said logical order.

2. The local area network according to claim 1 further comprising address manager means for preventing a node from writing said LAN data cell in said collection location for a predetermined number of successive frame times immediately after said LAN data cell from said node is broadcast.

3. The local area network according to claim 2, wherein said common switch core includes address manager means for reversing the role of the collection and broadcast locations for each successive frame time.

4. The local area network according to claim 3, further comprising:

a plurality of common switch cores, each having identical structure with said common switch core, and a plurality of expansion units, each of said common switch cores connecting said plurality of expansion units, in that each of said plurality of expansion units reads a LAN data cell stored in said first LAN data memory location of said core memory of one of said common switch cores, sends to said one of said common switch cores either a competing LAN data cell to be collected in said second LAN data memory location of said core memory of said one of said common switch cores or an indication of no competition, during each successive frame time if transmission, and reverses the role of said first and second LAN data memory locations of said core memory of said one of said common switch cores in each successive frame time;

each of said expansion units in turn connecting a plurality of nodes and containing at least its own first and second LAN data memory locations therein said own first and second data memory locations in each of said expansion units alternately functioning as a collection location for storing said competing LAN data cell to be broadcast and as a broadcast location for holding a LAN data cell that is being broadcast among said nodes connected thereto in each successive frame time.

5. The local area network according to claim 4, wherein said plurality of common switch cores and expansion units have taps provided on links connecting said common switch cores and expansion units.

6. The local area network according to claim 3 wherein said LAN data cell has a priority indication.

7. The local area network according to claim 3 wherein said LAN data cell has a block transfer indication.

8. The local area network according to claim 4 wherein said LAN data cell has a priority indication.

9. The local area network according to claim 4 wherein said LAN data cell has a block transfer indication.

10. In a switched communication network containing a common switch core and nodes connected to said common switch core in a star fashion among which nodes data are switched in framed cells by way of a core memory of said common switch core, each frame composed of an administration cell and zero or more data cells, a method of switching a LAN data cell using said administration cell among said nodes in a local area network formed in said switched communication network by connecting said nodes in a predetermined logical order, comprising steps of:
each node reading a LAN data cell stored in a first LAN data memory location of said core memory and sending to said common switch core either a competing LAN data cell to be collected in a second LAN data memory location thereof or an indication of no competition, during each successive frame time;
reversing the role of said first and second LAN data memory locations in each successive frame time; and
repeating said frame times until no node has a competing LAN data cell to send to said common switch core.

11. The method of switching a LAN data cell in a local area network according to claim 10, comprising a further step of:
ensuring that a node sit out for a predetermined number of successive frame times immediately after its own competing LAN data cell is broadcast.

12. The method of switching a LAN data cell in a local area network according to claim 11, comprising a further step of:
said common switch core reversing the role of said first and second LAN data memory locations in each successive frame time by means of an address manager contained in said common switch core.

13. The method of switching a LAN data cell in a local area network according to claim 12, comprising a further step of:
said address manager directing a competing LAN data cell to be collected according to a priority indication contained in said competing LAN data cell.

14. The method of switching a LAN data cell in a local area network according to claim 10, which said local area network includes a plurality of common switch cores, each having identical structure with said common switch core, and expansion units, each of said expansion units connecting a group of said nodes and each of said plurality of common switch cores, further comprising steps of:
each of said expansion units reading a LAN data cell stored in said first LAN data memory location of said core memory of one of said common switch cores and sending to said one of said common switch cores either a competing LAN data cell to be collected in said second LAN data memory location of said core memory of said one of said common switch cores or an indication of no competition, during each successive frame time of transmission;
reversing the role of said first and second LAN data memory location of said core memory of said one of said common switch cores in each successive frame time; and
repeating said frame times until no expansion units have a competing LAN data cell to send to said one of said common switch cores.

* * * * *